UNITED STATES PATENT OFFICE.

HENRY PEMBERTON, OF EAST TARENTUM, PENNSYLVANIA.

IMPROVEMENT IN REFINING COAL-OILS.

Specification forming part of Letters Patent No. 24,952, dated August 2, 1859.

*To all whom it may concern:*

Be it known that I, HENRY PEMBERTON, of East Tarentum, in the county of Allegheny and State of Pennsylvania, have invented a new and useful Improvement in the Process of Refining Coal-Oils; and I do hereby declare the following to be a full, clear, and exact description thereof.

My invention consists in the mode hereinafter described of treating the residuum left after the purification of the hydrocarburets obtained from the distillation of coals and other bituminous substances for the purpose of recovering the sulphuric acid employed in the process of purification, which has not, as far as I know, been heretofore successfully accomplished.

The products resulting from the destructive distillation of cannel-coal, bituminous coal, bituminous shale, petroleum, or mineral naphtha, and other similar substances require to go through a process of purification in order to remove those substances which are susceptible of decomposition by or of combination with acid and alkali, and the presence of which would prove highly injurious. The process ordinarily employed in the purification of these liquid and solid hydrocarburets resulting from the distillation of coals, &c., consists, first, in separating by distillation those combinations which have less density and a lower boiling-point from those which are specifically heavier and less volatile, and, after being purified as far as is practicable in this manner, they are subjected to the action of concentrated sulphuric acid and a strong solution of caustic alkali in order to remove from the neutral oils all substances capable of being decomposed or entering into combinations with those reagents. The quantity of acid and alkali required to effect these changes varies considerably, and depends on the nature of the crude material originally employed; but in the aggregate it is a very large amount, averaging about twenty per cent. in weight of acid and ten per cent in alkali of the oil under treatment.

As the quantity of coal-oil now manufactured is very large and constantly increasing, and as the expense of these chemical agents used in the purification of it greatly increases its cost, it becomes a matter of considerable importance to recover, if possible, a part, if not all, of the acid and alkali thus employed. No difficulty has been experienced in regaining the alkali, as its indestructible nature allows of its being subjected (either when pure or in combination with organic acids and other compounds) to a high degree of heat, which burns out and destroys the organic matter and merely converts the caustic alkalies into carbonates, in which state they retain a large part of their commercial value, and may, if desired, be easily restored to their caustic state by treatment in the usual way with lime. It is different, however, with the sulphuric acid after it has acted upon the coal-oils, for the exposure of the acid to a sufficiently high heat to destroy the matters then found in combination with it will decompose the acid itself, the tarry matters and organic acid present in the residuum which contains the sulphuric acid causing the sulphuric acid to yield oxygen to them, and itself, undergoing decomposition, forming sulphurous acid and a mixture of carbonic acid, carbonic oxide, and volatile pyroligneous matters, which prevent the employment of the sulphurous acid in the acid-chambers for the reformation of sulphuric acid, and almost, if not entirely, destroys its usefulness for any purpose whatever. The fact of this union of organic bases with the sulphuric acid and the appearance of the mixture, which, in its partial transparency and uniform consistency, exactly resembles a definite combination, have seemed to preclude any method of separating the acid from the tar. I have discovered, however, that this decomposition can be effected by exposing the residuum, which is a compound of acid and tarry matters, to the combined action of water and heat, whereby, under the influence of the high temperature, the attraction of the tarry matters for the acid is overcome by the superior affinity of the acid for the water, so that the acid separates itself from the tarry matters and dissolves in the water, from which it may be obtained in a concentrated state and purified by various means.

In this separation of the sulphuric acid from the tarry residuum of the purification of the hydrocarburets resulting from the distillation of coal and other bituminous substances consists my invention, to enable others skilled in the art to make practical use of which I will proceed to describe more in detail the manner in which I carry it into effect.

The residuum from the purification of coal-oils, consisting of a mixture of tarry matters and acid, is first subjected to allow heat, not above 212° Fahrenheit—the boiling-point of water—in a suitable vessel, which renders it more fluid and allows any oil it may yet contain to separate from it, which, as the mixture is then left to cool, will arise to the surface, and may readily be decanted, leaving the residuum, when cold, of the consistence of thick wood-tar. This tarry residuum is then placed in a vessel made of lead or other suitable material to resist the action of the acid, and of any convenient shape, of about equal depth and diameter, and to it is added in this vessel about five times its bulk of hot water. Into this vessel is inserted a pipe, that portion of the pipe which is inside the vessel being perforated with a number of small holes and immersed in the contents of the vessel. Through this pipe steam is introduced, which, escaping through the openings in the pipes, causes a violent ebullition and agitation of the tarry mixture and water, which is kept up for a sufficient length of time to bring all the particles of the tarry residuum under treatment in contact with the hot water, and thus cause the sulphuric acid which was mingled with it to unite with the hot water. This process must be continued for a longer or shorter time, varying from one to ten hours, or even longer, according to the size of the vessel and the quantity of tarry matter under treatment, and the process may be accelerated by the mechanical agitation of the contents of the vessel, so as more thoroughly to expose the tarry mixture to the action of the hot water and steam. When the tarry mass is by this process deprived of the acid it will be found to be completely altered in its properties. Instead of being, as at first, a semi-fluid, and transparent, in thin layers, it has now become much more dense, even at the high temperature given it by the steam, and when allowed to cool will be found to be a hard, resinous, and opaque black mass, readily reducible to powder and totally deprived of any acid taste. The aqueous solution thus procured is of a light-yellow color, its density being about 1.08, and proves to be nearly pure dilute sulphuric acid, contaminated, however, with small amounts of organic matter in solution. This dilute acid may be employed without further purification or concentration for many purposes; but by evaporation in leaden pans to the density of 1.45 it is strong enough to be employed for the decomposition of common salt in the production of sulphate of soda as a step in the manufacture of soda-ash. By pushing the concentration of the dilute sulphuric acid to 1.70 (which is as far as it is safe to carry the process in leaden vessels) the acid thus procured becomes dark-colored and opaque, evolving a little sulphurous acid. By diluting it now with water a small quantity of carbonaceous matter separates, leaving the acid much lighter in color. It is then concentrated again, and again slightly diluted with water, and thus becomes a light-brown color, and after again concentrating the acid and diluting with water and adding a little purified animal charcoal or nitric acid the acid is obtained sufficiently pure to permit of its being still further condensed in platinum until it is strong enough to be again used, as at first, in the purification of coal-oils.

As the quantity of organic matter remaining in the acid after it has been concentrated, as before stated to be about 1.45, or between that density and 1.70, is so inconsiderable as to be no disadvantage in the use of the acid for most purposes, it may be better in a pecuniary point to carry the process of concentration of the acid no farther than it can be done in leaden vessels.

The process I have described may be varied, if desired, by dispensing with the introduction of steam and applying the heat outside of the vessel containing the tarry mass and hot water, and thus securing the effect of heat and moisture; but the plan I have described is in my judgment the most desirable and efficient.

Having thus described my improvement in the process of purifying oils extracted from coal and other bituminous substances, what I claim as my invention, and desire to secure by Letters Patent, is—

Recovering the sulphuric acid used from the residuum resulting from the process of the purification of coal-oils with sulphuric acid by treating the residuum with water heated or caused to boil by steam or otherwise, substantially in the manner hereinbefore described.

In testimony whereof the said HENRY PEMBERTON has hereunto set his hand in presence of us.

H. PEMBERTON.

Witnesses:
W. BAKEWELL,
MARTIN G. CUILING.